United States Patent [19]

Peterson

[11] 4,420,048
[45] Dec. 13, 1983

[54] DISK GANG ASSEMBLY
[75] Inventor: Willard E. Peterson, Geneseo, Ill.
[73] Assignee: Deere & Company, Moline, Ill.
[21] Appl. No.: 329,546
[22] Filed: Dec. 10, 1981
[51] Int. Cl.³ .......................................... A01B 23/06
[52] U.S. Cl. ................................... 172/568; 172/599
[58] Field of Search ............... 172/599, 600, 601, 548, 172/568, 556; 301/36 R; 308/19, 181

[56] References Cited
U.S. PATENT DOCUMENTS

| 613,292 | 11/1898 | Morrow | 172/568 X |
| 670,070 | 3/1901 | Willis | 172/601 X |
| 2,067,620 | 1/1937 | Johnston | 301/36 R |
| 2,468,278 | 4/1949 | Thomas | 172/599 X |
| 2,477,662 | 8/1949 | Seaman | 172/556 X |

FOREIGN PATENT DOCUMENTS 161150 12/1962 U.S.S.R. ............................. 172/548

Primary Examiner—Richard J. Johnson
Attorney, Agent, or Firm—Henderson & Sturm

[57] ABSTRACT

A disk gang assembly constructed in such fashion as to eliminate the long center tie bolt. An arrangement is provided comprising a plurality of like disks spaced axially apart on a common axis and held in spaced apart relation by a plurality of interspaced spacers. Each spacer is provided at opposite ends with radial flanges to receive and sandwich disks respectively therebetween. The disks and flanges have notching bolt holes through which sets of bolts or the like are passed to secure the disks and spacers together as a rigid axial unit. The spacers are mutually axially piloted on each other and opposite ends to maintain the coaxial status and each pilot includes an annular shoulder for receiving a complementary central circular opening in each disk. End spools are also provided for carrying bearings for mounting the assembly in a supporting frame.

5 Claims, 14 Drawing Figures

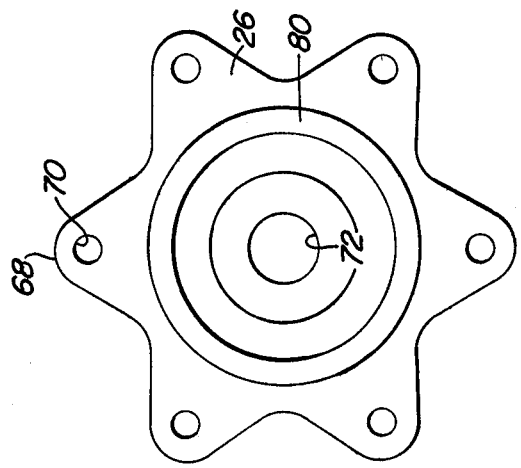
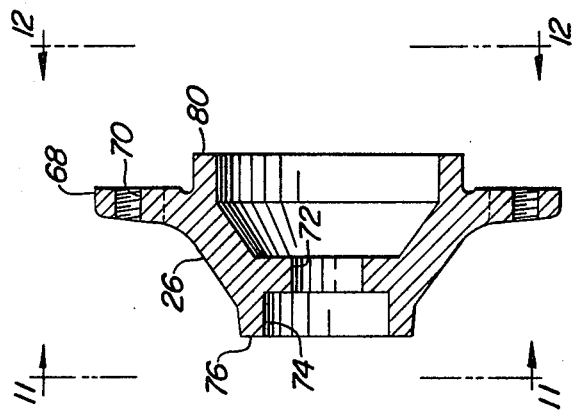
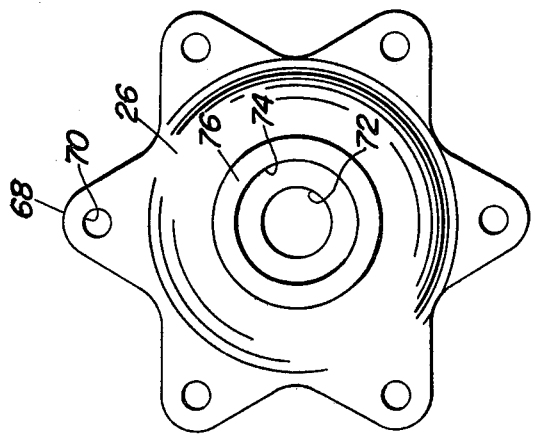

DISK GANG ASSEMBLY

BRIEF SUMMARY OF THE INVENTION

The basic disk gang comprises a plurality of like disks arranged in axially spaced apart relation on a common axis, being spaced apart by intervening tubular spools. A long tie bolt, commensurate in length with that of the particular assembly or unit, is passed coaxially through the disks and spools, the bolt being headed at one end and provided at its other end with a securing nut.

Among the several disadvantages of this type of construction is that, in the event of damage to, or other need for replacement of, a disk or spool, the tie bolt must be removed, in whole or in part, depending upon the location of the part in need of replacement. This means, in some instances, substantial disassembly, resulting in the expenditure of considerable time and effort and the possible loss of parts. Further, the manufacturer or supplier must maintain an inventory of various-length tie bolts, which are mainly of substantial length, thus creating problems of storage, shipment etc. In operation, the tie bolt requires frequent inspection to determine whether it is adequately torqued, because excessive looseness results in premature wear, breakage, etc.

According to the present invention, these and other problems are eliminated, mainly by elimination of the use of a tie bolt as a means of securing the disks and spacer together. Instead, the disks are secured together in axially spaced apart relation by a series of spacers, one between each pair of neighboring disks. Each disk is provided with a central, preferably circular opening, and opposite ends of adjacent spacers have means thereon for piloting on each other as well as for relatively tightly fitting the disk opening. The disk and radial flanges on the meeting or mating ends of the spacers have matching bolt holes through which threaded securing means, such as automotive type bolts, are passed and tightened. Thus each disk is sandwiched between mating, piloted ends of adjacent spacers, resulting in an axially rigid unit.

The assemblies may be arranged as a plurality of series; for example, front and rear rights and lefts, and each series will have a length according to the dimensional design of the harrow or like implement. The spacers are preferably identical and thus lead to a modular design and simplification of manufacture, inventory and shipment. Each series may be provided at axially spaced intervals with cooperative spools for mounting bearings by means of which the assembly or series is carried by the implement frame. Each spool has a flange cooperative with a disk near the end of the series; that is, the spool flange and the flange on the next adjacent spacer sandwich this disk therebetween in a manner not unlike the relationship between adjacent spacer flanges. The difference is that the spool has a cylindrical reduced-diameter portion on which a bearing is mounted and one of these may be provided at opposite end portions of the series. In the event of an exceptionally long series, more than two such spools and bearing mountings may be used. The spool and spacer flanges are the same so that they are compatible with each other in providing for series of different lengths.

The bearing mounting spool is augmented by a subsequent spool which confines the adjacent bearing between the two spools and this latter spool is flanged and cooperates with a similarly flanged end cap to sandwich therebetween what may, in some cases, be the last disk at one end of the series. A similar arrangement is used at the opposite end of the series to mount the last disk, for example, at that end of the series.

A significant advantage of the invention lies in the ease and speed with which repairs and replacements may be made. For example, if a replacement is required in the middle of a series, the series may be disassembled only in that area, the replacement made and the series reassembled, all without the bother of a long and cumbersome tie bolt. Similarly, the spool and bearing arrangement makes it easy to replace end bearings without breaking the entire series down.

Further features and advantages will become apparent to those versed in the art as a preferred embodiment of the invention is described in detail in conjunction with the accompanying sheets of drawings.

DESCRIPTION OF THE DRAWINGS

FIG. 10, drawn to the above scale, is a sectional view of a short spool

FIG. 11, again to the above scale, shows the short spool as seen from its left-hand end.

FIG. 12 shows the short spool as seen from its right-hand end, following the same scale.

DESCRIPTION OF A PREFERRED EMBODIMENT OF THE INVENTION

Figure 1:
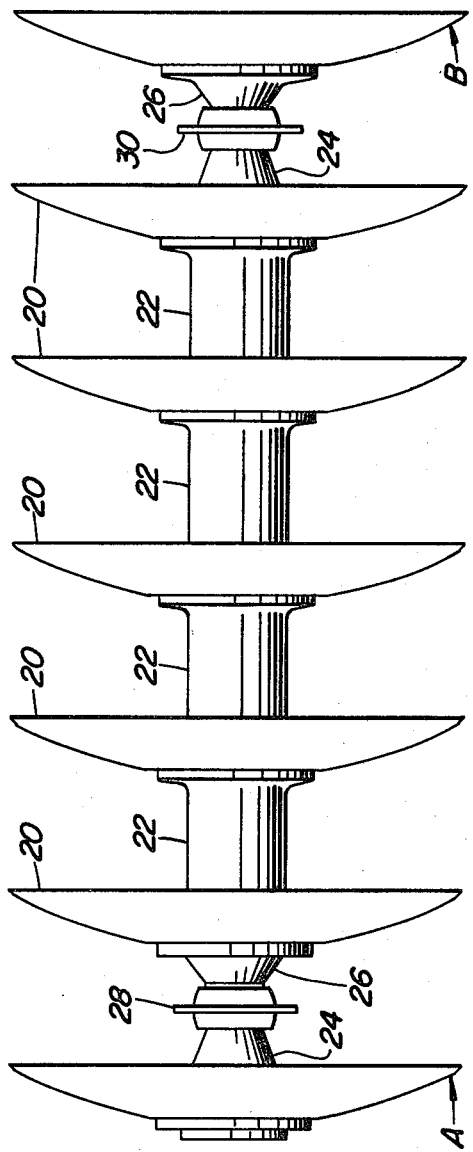
FIG. 1 is an elevation of one type of gang assembly embodying the invention.

FIG. 1 will be referred to as a general frame of reference. Here, as elsewhere herein, expressions as such "right," "left," "end most," etc., will be used in the interests of clarity and brevity and not by way of limitation.

Figure 3:
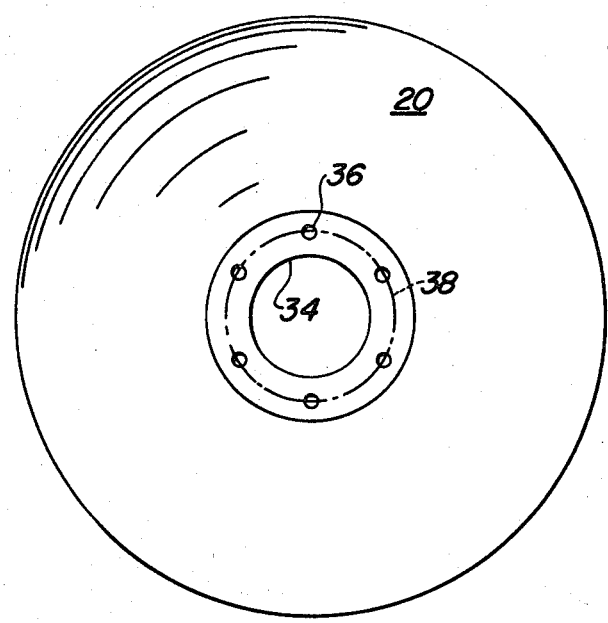
FIG. 3 is an end view of a disk, showing its central opening and circle of bolt holes.

The gang assembly chosen for purposes of the present disclosure is, in overall appearance, similar to known assemblies. The assembly shown is relatively short and comprises a plurality or series of like disks 20 of usual design arranged in axially spaced apart relation on a common axis and maintained in coaxial alinement by a plurality or series of spacers 22. At each end of the series, the assembly is provided witth coaxially interconnected long and short spools 24 and 26 respectively. The spool assembly at the left end of the assembly carries a bearing 28, and a similar bearing 30 is carried by the spool assembly at the right-hand end. The provision of bearings in these areas is typical of known assemblies, these bearings being used to mount the gang assembly in a suitable harrow or like frame (not shown). One of the disks is shown by itself in end elevation in FIG. 3, wherein it will be seen that the disk has a central, preferably circular opening 34 ringed by a plurality of bolt holes 36 arranged in equi-angularly spaced relation on a bolt circle 38.

Figure 6:
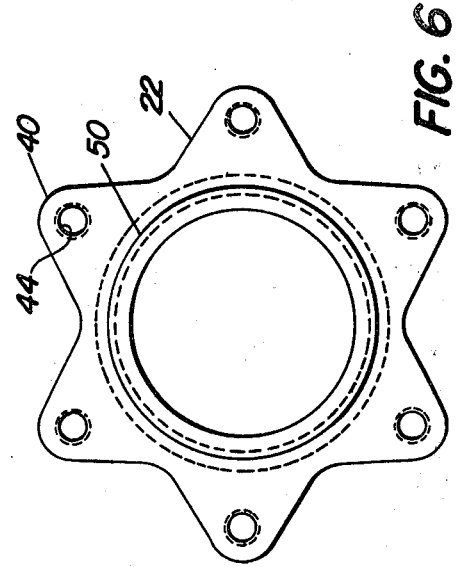
FIG. 6 is an end view of the spacer as seen from its right-hand end.
Figure 5:
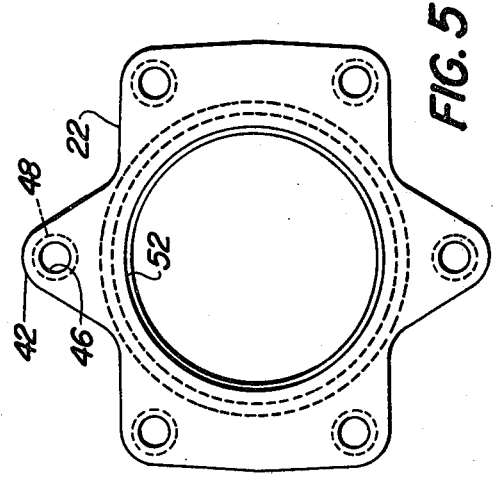
FIG. 5 is an end view of the spacer as seen from its left-hand end.
Figure 4:
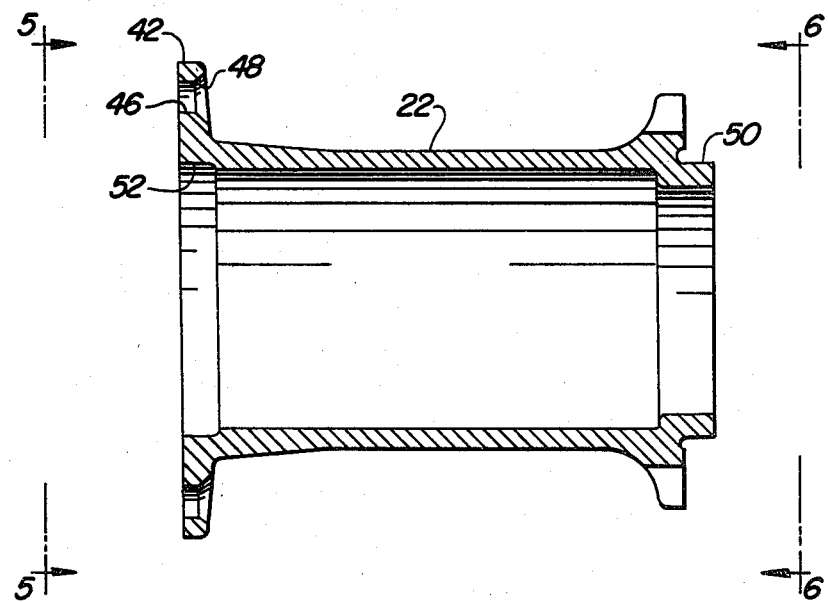
FIG. 4 is an enlarged sectional view of a spacer.

One of the spacers is shown by itself in FIGS. 4, 5 and 6. Since these are or may be identical, the description of one will suffice for all. Each spacer is formed of acceptable nodular iron and is preferably tubular to reduce weight while retaining adequate strength. The spacer is formed at its right end with an integral radial flange 40 and at its left end with an integral radial flange 42, both flanges being preferably scalloped rather than circular, which difference is immaterial so far as concerns the basics of the invention. The flanges 40 and 42 are provided respectively with pluralities of bolt holes 44, 46 equal in number (here six, e.g.) and spacing to the bolt holes in the disks and arranged on a like bolt circle. Because of the type of threaded fasteners employed, preferably automotive type bolts 47 (see FIG. 2), the bolt holes 44 are tapped bores and the bolt holes 46 are through-bores internally chamfered at 48 to receive the truncated conical portions of the bolts 47.

Also formed at the right end of the spacer 22 is an integral annular shoulder 50 which projects axially to the right of the right face of the flange. The diameter of this shoulder is such that it will relatively closely receive the central hole 34 in a disk. For example, in a design on which the present disclosure is based, the diameter of the disk opening is about one-hundred twenty mm. and the outside diameter of the shoulder is about one-hundred nineteen and six-tenths mm. These dimensions are, of course, illustrative only and not limiting. The left end of the spacer 22 is formed with an interior annular recess 52 so dimensioned (here one-hundred twenty mm.) as to receive or partly telescope over the shoulder 56 of the next adjacent spacer to the left, whereby the spacers are mutually piloted on each other and thus improve the axial rigidity of the assembly. Further, the associated disk, fitting over the shoulder 50 of one spacer, is sandwiched between the left flange 42 of one spacer and the right flange 40 of the next leftward spacer and is clamped tightly between the two flanges by the bolts 46. Moreover, the axial depth of the annular recess 52 exceeds the axial length of the shoulder 50 so that the shoulder will not bottom out axially in the recess, thus assuring adequate axial clearance to effectuate the clamping action of the flanges on the disk. See FIG. 2.

Figure 2:
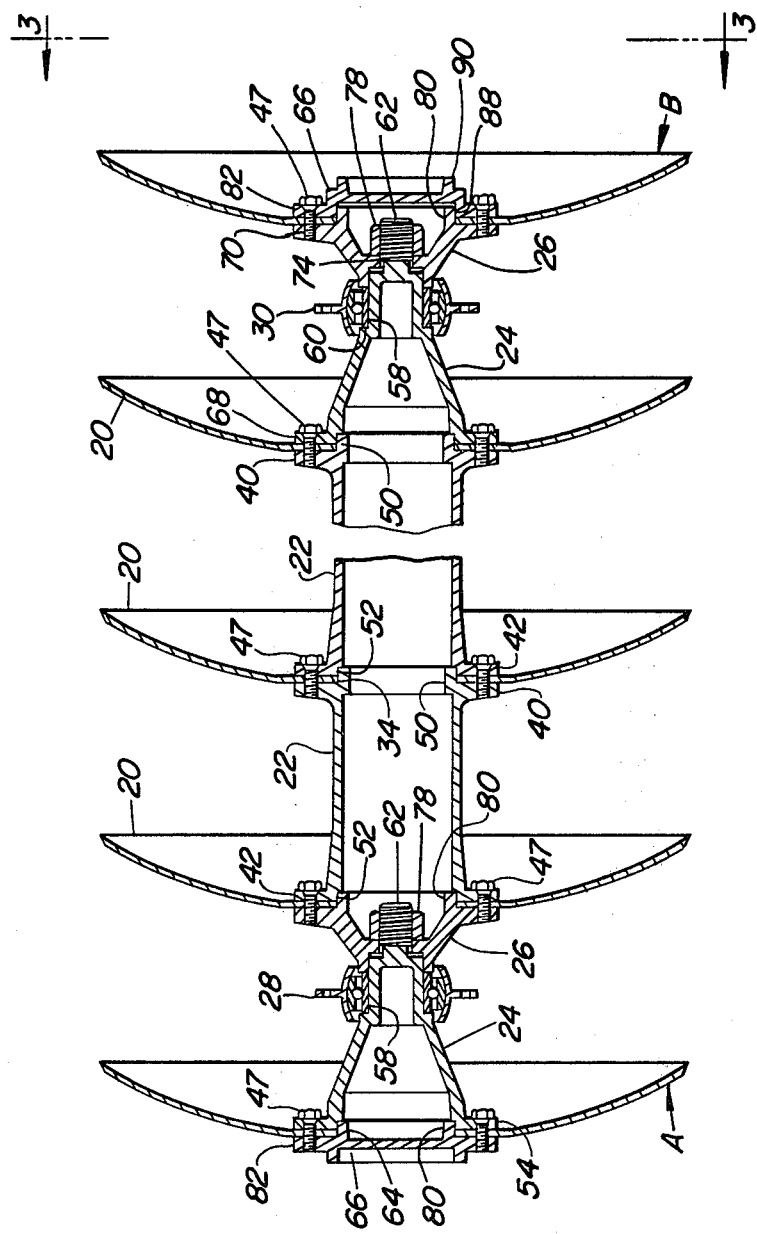
FIG. 2 is a view on a scale enlarged over that of FIG. 1, shown in longitudinal or axial section and having intermediate portions omitted in order to conserve space.

From the description thus far, and considering FIGS. 1 through 6, and especially FIGS. 1 and 2, it will be seen that several spacers are arranged end-to-end with disks sandwiched therebetween to provide an axially rigid unit comprising five disks and four spacers. It remains only to complete the assembly selected here by the addition of what may be termed the final left and right disks, for example, represented here at A and B respectively. At this point, however, it should be made clear that more spacers, disks and spools may be used to form an assembly of greater length, of, say, four to five meters.

Figure 7:
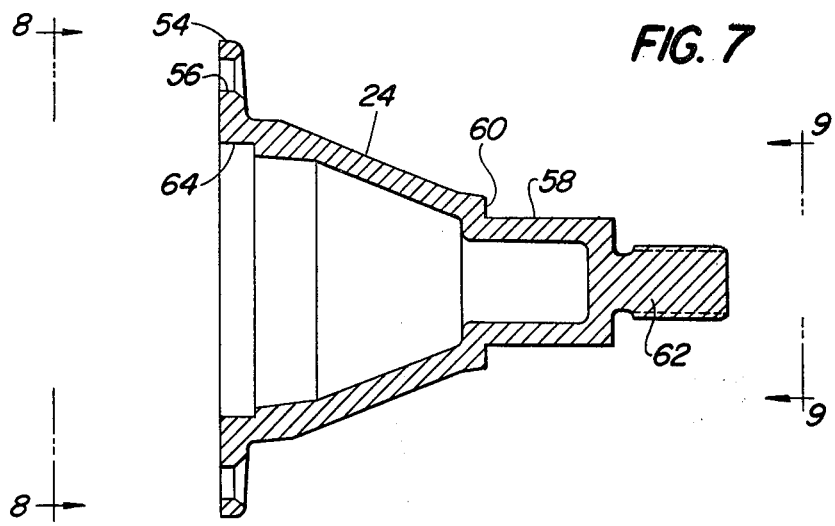
FIG. 7 is a sectional view of a long end spool, drawn to the scale of FIG. 4.
Figure 8:
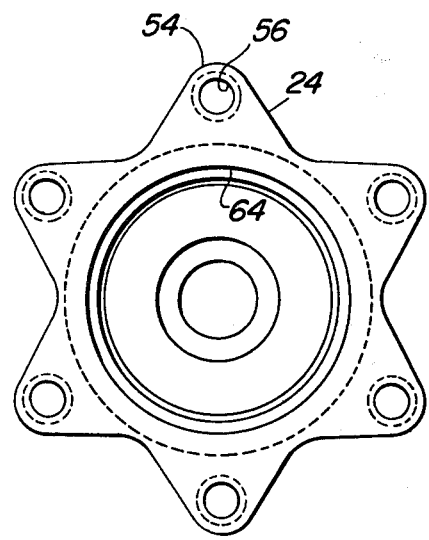
FIG. 8 is a similarly-scaled left-hand end view of the long spool.
Figure 9:
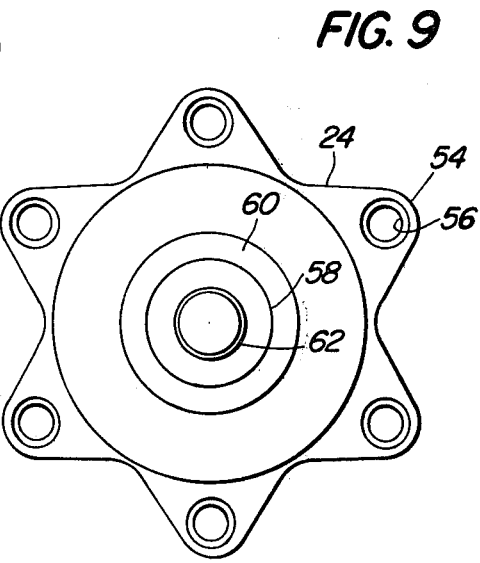
FIG. 9, likewise to the same scale, is a view of the right-hand end of the long spool.
Figure 13:
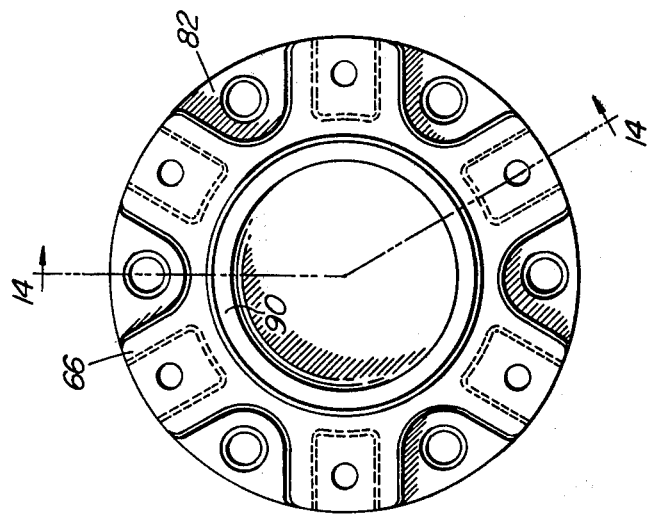
FIG. 13 is an end view of an end cap as seen from its right-hand end.
Figure 14:
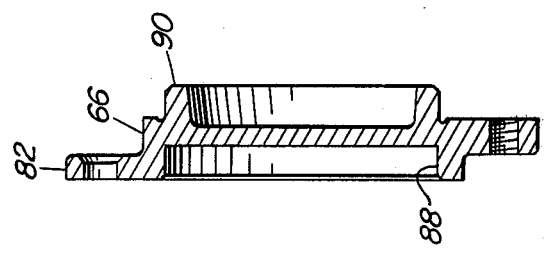
FIG. 14 is a sectional view of the end cap as seen along the line 14—14 of FIG. 13, the above scale being used.

Since the long spools 24 are or may be identical, only one will be described, reference being had to FIGS. 7, 8 and 9. As in the case of the spacers 22, the long spool is formed of nodular iron and is somewhat elongated and partly conical in shape. At its left end it has an integral radial flange 54 provided with a plurality of bolt holes 56 equal in number, spacing and circumferential arrangement to those already described. The bolt holes 56 are chamfered at the right face of the flange 54 for receiving the bolts 47. The spool is essentially tubular for purposes already referred to but at its right end has a cylindrical bearing portion 58 of reduced diameter as compared to that of the spacers, for example. The bearing portion adjoins the tapered part of the spool to provide an annular abutment means or shoulder 60. The bearing 30 is carried by the bearing portion 58 and at one side abuts the shoulder 60. The bearing portion continues axially to the right as a threaded extension 62. As best seen in FIG. 2, the spool flange 54 abuts the right-hand face of the disk next leftward of the end disk B and is secured in place by additional bolts 47. The left face of the spool has an interior annular recess 64 which receives that portion of the shoulder 50 of the next leftward spacer exactly as the spacer annuli receive the spacer shoulders, the parts in this respect being mutually compatible. The spool thus becomes in effect an integrated extension of the spacers at the right end of the assembly.

The assembly, to the extent of the selected embodiment, is completed at the right end by the addition of a short spool 26, the end disk B and an end cap 66. The short spool is shown in FIGS. 10, 11 and 12. It, like the spacers and long spools, is formed of nodular iron and is of somewhat conical shape, having its smaller end facing the right end of the associated long spool and its larger end provided with an integral radial flange 68 which has a plurality of bolt holes (here tapped bores) 70 equal in number, spacing, etc., to those described in connection with the other flanges. The smaller end has an axial bore 72 and an adjacent leftward larger counterbore 72. The counterbore fits the end of the long spool bearing portion 58 that projects axially beyond the bearing 30 and the left end of the counterbored portion provides a shoulder or abutment means 76 that axially abuts the bearing 30 at its right side, thus confining the bearing between the two abutment means 60 and 76. A nut 78 threaded on the portion 62 of the long spool secures the spools axially together.

The short spool is completed by the integral inclusion thereon of an annular shoulder 80 that projects axially rightward of the flange 68, and this shoulder, being dimensioned according to the shoulders previously described, receives and closely fits the central opening in the disk B. The right end of the short spool is open so as to receive the nut 78 and to accommodate a tightening tool, such as a wrench (not shown). The nut is applied and tightened before the disk B and end cap 66 are added. The end cap has a radial flange 82 similar to the flanges described before, but this flange is different in that it has two sets of bolt holes 84 and 86, the set 84 being tapped and the set 86 being through bores. This is resorted to so that the end cap is interchangeable from end to end of the assembly, as will appear in greater detail subsequently. The end cap is formed at one side with an annular recess 88 and at its opposite side with an annular shoulder 90, which are respectively identical to the recesses and shoulders described earlier. At the right end of the assembly, the end cap recess 88 cooperates with the right-hand shoulder 80 of the short spool in mounting the disk B and in improving the axial stability of the unit at that end. Bolts 47 complete the assembly, the bolts in this case being threaded into the tapped bores 70 of the short spool flange 68.

At the left end of the assembly, similar long and short spools and end caps are used. The spools are assembled with the bearing 28 via the nut 78 as before but in this instance the short spool shoulder 80 cooperates with the disk next rightward of the disk A and with the left end of the next rightward spacer 22, the shoulder 80 being received by the disk center opening and by the interior annula recess 52 of the spacer. Again the mutual compatability of the parts will be observed. The left-hand long spool projects axially to the left and mounts the disk A via bolts 47 through the long spool flange 54, disk bolt holes and the left end cap flange 82. In this case, however, the bolts 47 are received in the tapped bores 86 of the end cap flange, and the end cap shoulder fits the interior annular recess 64 of the long spool as well as the central opening in the disk A.

Should it be desired to increase the length of the assembly by the addition of more disks, say, to the left, the left end cap is replaced with a spacer 22, the right flange of which is secured to the flange of the long spool with the disk A sandwiched therebetween. More spacers and disks may be added to the left and, if the series of spacers and disks are several in number, the left end of the assembly may be completed by the use of another assembly of long spool, short spool, bearing and end cap, in which case, the assembly will include three bearings. This is all made possible by the modular nature of the elements and the dimensional characteristics that give them considerable flexibility in assembly.

Features and advantages other than those specifically described will become apparent to those versed in the art, as will many modifications and alterations in the preferred embodiment disclosed, all of which may be achieved without departure from the spirit and scope of the invention.

I claim:

1. A disk gang assembly, comprising a plurality of disks, a plurality of spacers coaxial with each other and with the disks and respectively interspaced and alternated among the disks to maintain the disks in axially spaced apart relationship, each spacer having opposite end radial flanges disposed so that the flange on one spacer abuts a disk from one side and a flange on the next adjacent spacer abuts the disk from the opposite side so as to sandwich each disk between adjacent flanges, said discs respectively having like-dimensioned central circular openings and at least one end of each spacer having an annular shoulder projecting axially beyond its flange and into and beyond the respective central opening, each shoulder being dimensioned to relatively closely fit the central disk opening into which it projects, the end of each spacer opposite to that having the annular shoulder being provided with an annular recess into which the adjacent shoulder projects, each recess and shoulder being so dimensioned as to provide a relatively close annular fit, the flanges and the disks having matching bolt holes on axes parallel to the disk and spacer axis, a plurality of threaded securing means cooperative among the bolt holes of adjacent flanges and the sandwiched disks for securing the disks and spacers together as an axially rigid unit, said spacers and disks being arranged in a series in which the last spacer in the series abuts the last disk in the series from only one side, a coaxial spool arranged at the opposite side of that disk and having a radial flange abutting that side of the disk, said flange having bolt holes matching those of the disk and the last spacer flange, additional securing means cooperating via the flange and disk bolt holes to secure the spool and spacer together with said disk sandwiched therebetween, said spool having a reduced-diameter, coaxial cylindrical bearing portion axially beyond said disk, said bearing portion including an annular abutment means, a bearing carried on the bearing portion and abutting the abutment means, a second spool arranged coaxially with and axially beyond the first spool and having an annular recess carried by the first spool bearing portion and an abutment means abutting the bearing from the side axially opposite to the first-named abutment means, and means securing the two spools together.

2. A disk gang assembly as defined in claim 1, further characterized in that the securing means includes a coaxial, externally threaded extension of the bearing portion, the second spool has an axial opening through which the extension projects, and a nut is threaded on the extension.

3. A disk gang assembly as defined in claim 2, further characterized in that the second spool is provided axially beyond the nut with a radial flange similar to those aforesaid and provided with bolt holes as aforesaid, and a further disk engages said last named flange, and further securing means cooperates among the disk and flange bolt holes to mount said further disk.

4. A disk gang assembly as defined in claim 3, further characterized in that an end cap is disposed coaxially at the side of the further disk opposite to the second spool flange and has a flange like those aforesaid abutting said further disk, said end cap flange having bolt holes matching those of the disk and second spool flange and receiving said additional securing means.

5. A disk gang assembly as defined in claim 4, further characterized in that the second spool has an annular shoulder relatively closely fitting the central opening of the further disk and the end cap has an annular recess receiving a portion of said shoulder.

* * * * *